(12) United States Patent
Monti

(10) Patent No.: US 8,348,794 B2
(45) Date of Patent: Jan. 8, 2013

(54) DEVICE FOR ACTIVATING A COGGED FLEXIBLE TRANSMISSION ORGAN

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 13/562,708

(22) Filed: Jul. 31, 2012

(65) Prior Publication Data
US 2012/0295749 A1 Nov. 22, 2012

Related U.S. Application Data

(62) Division of application No. 12/419,151, filed on Apr. 6, 2009, now Pat. No. 8,267,823.

(30) Foreign Application Priority Data

Apr. 16, 2008 (IT) .............................. B02008A0233

(51) Int. Cl.
*F16H 55/36* (2006.01)
(52) U.S. Cl. ........................................ 474/141
(58) Field of Classification Search .................... 474/32, 474/152, 64, 86–87, 141, 166–169, 179, 474/249
See application file for complete search history.

(56) References Cited

U.S. PATENT DOCUMENTS

| | | | | |
|---|---|---|---|---|
| 3,597,985 A * | 8/1971 | Jeffrey | | 474/148 |
| 5,415,592 A * | 5/1995 | Hoyt | | 474/85 |
| 5,427,580 A * | 6/1995 | Ledvina et al. | | 474/84 |
| 5,588,926 A * | 12/1996 | Mott et al. | | 474/212 |
| 5,690,571 A * | 11/1997 | Mott | | 474/212 |
| 5,816,967 A * | 10/1998 | Ledvina et al. | | 474/84 |
| 5,911,307 A * | 6/1999 | Kraft et al. | | 198/847 |
| 7,210,573 B2 * | 5/2007 | Mol | | 198/847 |
| 7,850,562 B2 * | 12/2010 | DeGroot | | 474/153 |
| 2005/0064972 A1 * | 3/2005 | Rusheidat et al. | | 474/168 |
| 2009/0264233 A1 * | 10/2009 | Stief | | 474/133 |
| 2011/0092326 A1 * | 4/2011 | Kanamori et al. | | 474/152 |

* cited by examiner

Primary Examiner — Thomas B Will
Assistant Examiner — Joan D Misa
(74) Attorney, Agent, or Firm — William J. Sapone; Coleman Sudol Sapone P.C.

(57) ABSTRACT

A drive transmission system for activating a cogged flexible transmission organ includes a support pulley borne idle on a drive shaft which contacts tops of the organ cogs at a calibrated circumference thereof which defines a predetermined winding radius of the flexible transmission organ. A cogged drawing pulley is mounted on the drive shaft and has cogs for enmeshing with recesses in the cogged flexible transmission organ for advancing the flexible transmission organ. The drawing pulley has cogs sized for enmeshing with the recesses of the cogged flexible transmission organ, such that tops of the drawing pulley cogs are displaced from bottoms of the drawing pulley recesses. The drawing pulley therefore cannot drag on the flexible transmission organ when the support pulley is not subject to drive torque.

6 Claims, 5 Drawing Sheets

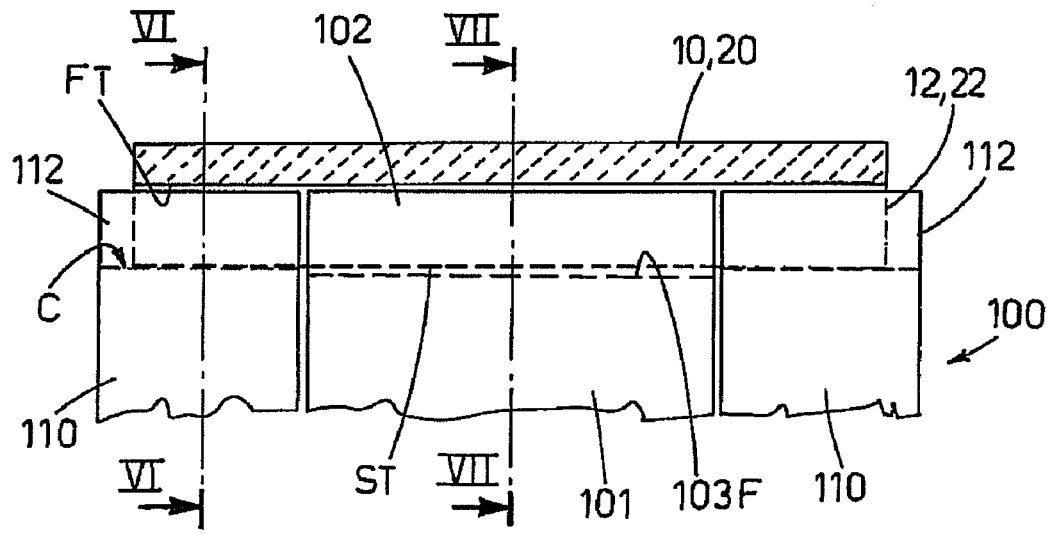
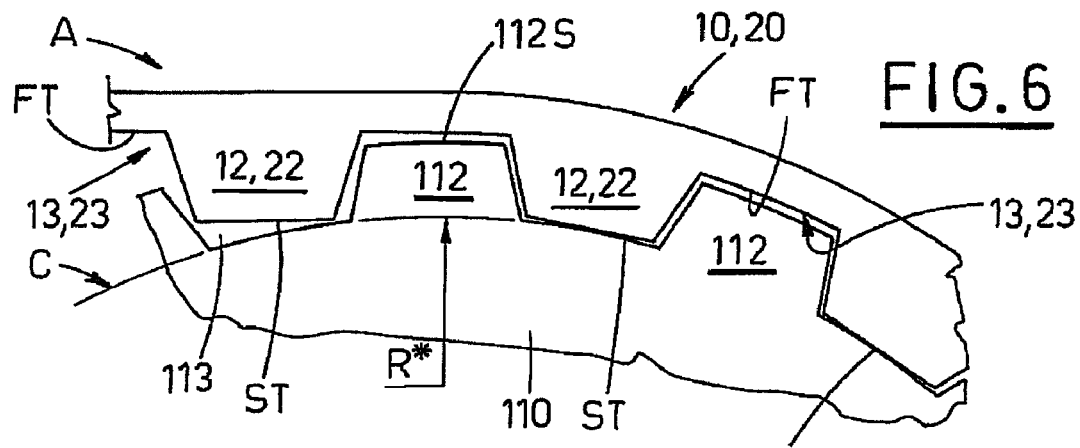
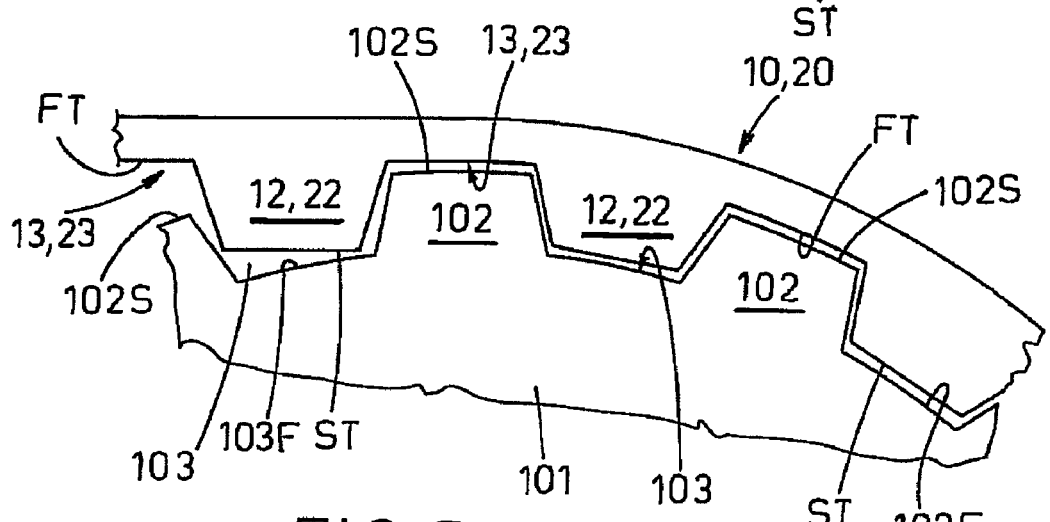

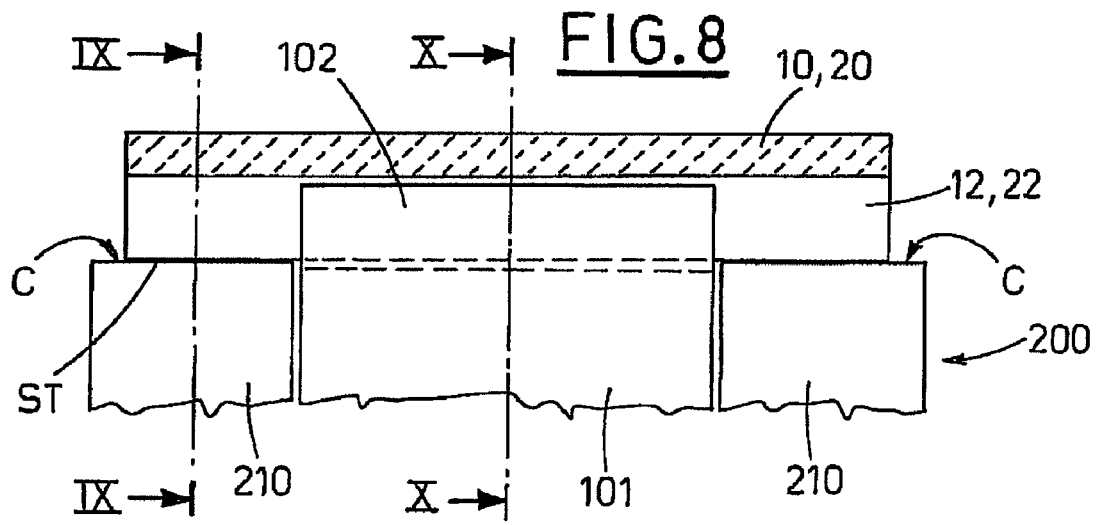
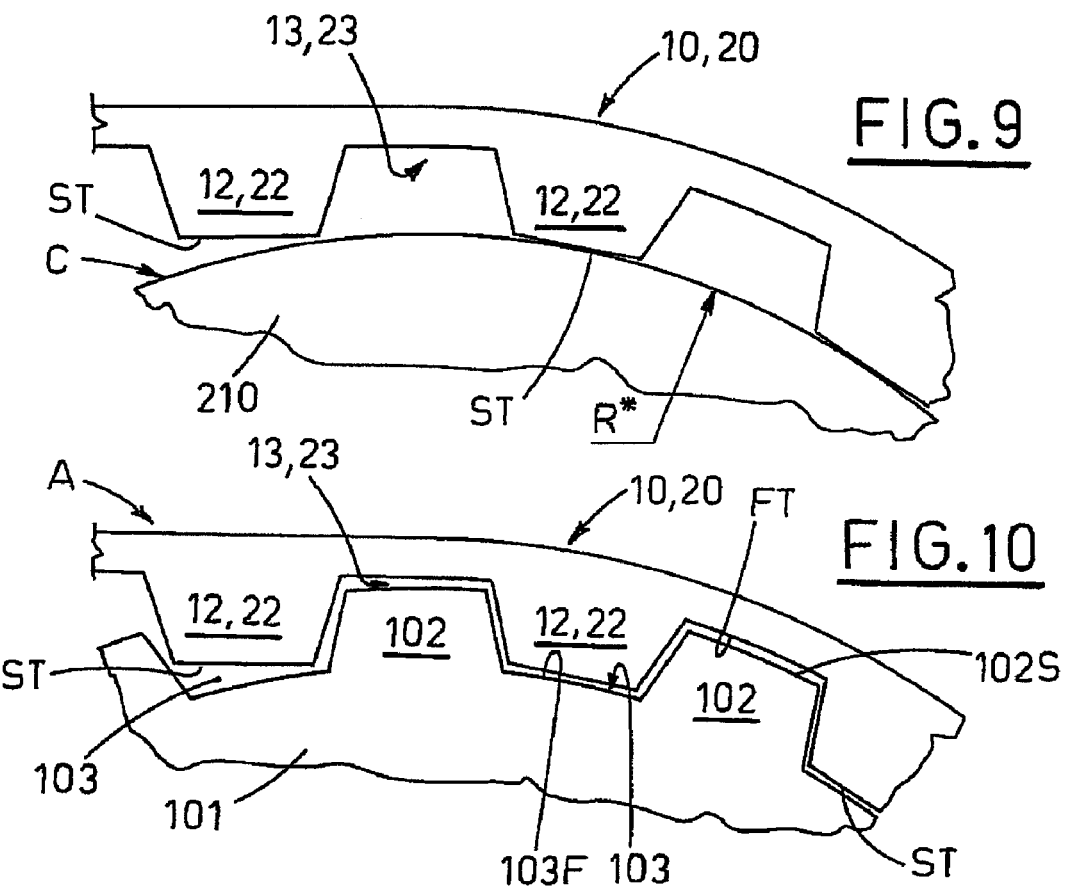
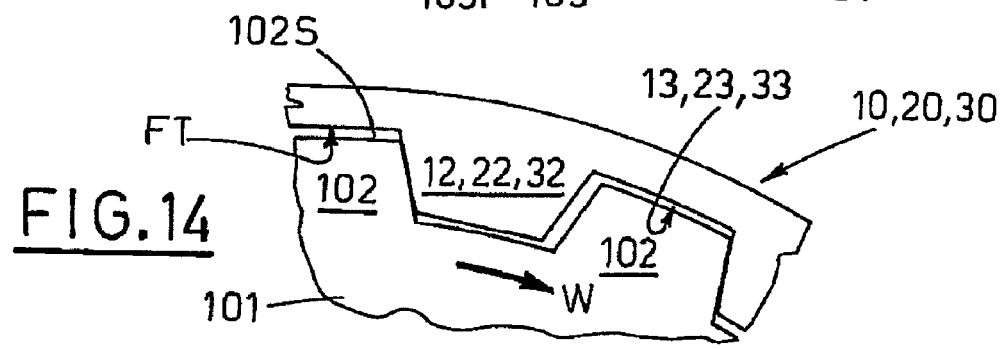

US 8,348,794 B2

DEVICE FOR ACTIVATING A COGGED FLEXIBLE TRANSMISSION ORGAN

CROSS REFERENCE TO RELATED APPLICATIONS

This application is a division of U.S. patent application Ser. No. 12/419,151 filed Apr. 6, 2009 now U.S. Pat. No. 8,267,823, which claims priority from Italian Patent application no. BO2008 000233, filed Apr. 16, 2008, the disclosures of which are incorporated by reference.

BACKGROUND OF THE INVENTION

The invention relates to the technical sector relating to systems of drive transmission with cogged belts or similar cogged flexible organs, for example a harmonic steel sheet exhibiting fashioned cogs.

In the simplest configuration, these systems are constituted, as is known, by a pair of cogged pulleys, of which one is a drive pulley and the other a driven pulley, connected to a cogged belt or other similar organ, of a suitable length.

In accompanying FIGS. 1, 2, 3 relating to the prior art, portions of a cogged belt 10 are illustrated, with a cogged drive pulley; FIG. 4, also relating to the prior art, illustrates, similarly to FIG. 1, portions of the cogged drive pulley 1 and a cogged flexible organ 20 of the above-indicated type, formed by a sheet 21 to which cogs 22 are associated.

With a above-mentioned elementary configuration, simple drive transmission between the drive pulley 1 and the driven pulley (not illustrated) can be obtained, or the basic design of a belt conveyor can be defined, the active branch of which coincides with the stretched branch A (the upper branch in the illustrated examples, with a clockwise rotation direction W of the drive pulley 1).

In the case of the conveyor, known drawing elements such as plugs, walls, edges etc., arranged at regular steps (not illustrated) can be associated to the external surface of the cogged belt 10.

Normally, the enmeshing between the flexible transmission organ 10, 20 and the pulley, whether a drive pulley 1 or a driven pulley, is such that the top SP of cogs 2 thereof meets the bottom FT of the recesses 13, 23 of the organ 10, 20 (FIGS. 1 and 4); in this way the radius R with which the flexible transmission organ 10, 20 winds on the pulley 1 is calculated with certainty (FIGS. 1, 2, 3).

The top ST of the cogs 12, 22 of the flexible transmission organ 10, 20 does not however meet the bottom FP of the recesses 3 of the pulley 1 (see FIGS. 1 and 4 again).

The dimension of the recesses 3 of the pulley 1 is established with a field of tolerance such that in any case the cogs 12, 22 of the flexible transmission organ 10, 20 can insert without interference on the sides, such as to guarantee the resting of the cogs 2 of the pulley 1 on the bottom FT of the chambers 13, 23 of the organ 10, 20 (FIGS. 1 and 4).

It is frequently found that there is a minimum of play between the recesses 3 of the pulley 1 and the cogs 12, 22 which couple with them (see FIGS. 1 and 4 once more).

In theoretical static conditions, each cog 12, 22 of the flexible transmission organ 10, 20 is considered to be centered with respect to the corresponding recess 3 of the pulley 1, such that the play is symmetrically distributed on the two sides (FIGS. 1 and 4).

The drawing of the flexible transmission organ 10, 20 following the starting-up of the drive pulley 1 is initially done by the friction existing in the contact zones between the top SP of the cogs 2 of the pulley 1 and the bottom FT of the recesses 13, 23 of the organ 10, 20.

The flexible transmission organ 10, 20 progressively tends to slide backwards with respect to the drive pulley 1, due to the resistant forces acting on the driven pulley or on the active branch A of the conveyor.

The first part of the sliding is absorbed by the play existing between the cogs 12, 22 of the flexible transmission organ 10, 20 and the recesses 3 of the pulley 1: when the flanks of the cogs and the recesses are in contact (FIG. 3) any further staggering between them is prevented, but not the tendency of the tops SP to slide with respect to the bottoms FT, so that when the pressure between the flanks increases, the drive torque of the pulley 1 consequently exerts, on the portion of the flexible transmission organ 10, 20 wound thereon, and consequently on the active branch A thereof, a sharp traction which pushes the cogs 12, 22 newly towards the centre of the recesses 3 of the pulley 1, with a consequent slippage in a same direction of the tops SP with respect to the bottoms FT.

The moment at which the pulley 1 returns the flexible organ 10, 20 forwards causes a sort of a clicking effect on the flexible organ 10, 20, which is cyclically repeated. This irregularity in advancement is detrimental, especially with regard to a belt conveyor, since it has a knock-on effect on the objects travelling thereon.

The above-described phenomenon is more evident the greater the interaxis between the drive pulley and the driven pulley, and consequently the length of the cogged flexible organ connecting them. The differences between the rated values and the real values of the cogging's primitive diameter and step also contribute to the appearance of the drawback, due to the possible shifts in the admissible tolerances.

SUMMARY OF THE INVENTION

The aim of the present invention is thus to provide a device for activating a cogged flexible transmission organ which is able to obviate the above-mentioned drawback independently of the development in length of the organ.

A further aim of the invention consists in providing a device of simple conception, applicable both where the flexible transmission organ serves to activate at least a driven pulley and where the organ constitutes a belt of a conveyor.

A still further aim of the invention relates to the desire to provide a device conformed such as to reduce wear of the flexible transmission organ.

The aforementioned aims are achieved by means of a device for activating a cogged flexible transmission organ, which comprises: at least a support pulley borne idle on a drive shaft and destined to abut, at a calibrated circumference thereof, a top of cogs of the flexible transmission organ in order to define a predetermined winding radius of the flexible transmission organ; at least a cogged drawing pulley, flanking the support pulley and keyed on the drive shaft and provided with cogs destined to enmesh with recesses of the flexible transmission organ in order to cause advancement of the flexible transmission organ, the cogs of the drawing pulley being of such a size that during said enmeshing tops thereof are displaced from a bottom of the recesses of the flexible transmission organ and such that tops of cogs of the flexible transmission organ are displaced from a bottom of recesses of the drawing pulley.

BRIEF DESCRIPTION OF THE DRAWINGS

The characteristics of the invention will become more evident in the following description of preferred embodiments of the device, according to what is reported in the claims and with the aid of the accompanying figures of the drawings, in which:

FIG. 5 is schematic transversal section similar to that of FIG. 2, with the device in a first embodiment;

FIG. 6 is a lateral section of an element of the device, according to section line VI-VI of FIG. 5;

FIG. 7 is a lateral section of a further element of the device, according to section line VII-VII of FIG. 5;

FIG. 8 is a schematic transversal section similar to that of FIG. 5, with the device in a second embodiment;

FIG. 9 is a lateral section of an element of the device, according to section line IX-IX of FIG. 8;

FIG. 10 is a lateral section of a further element of the device, according to section line X-X of FIG. 8;

FIG. 14 is a section similar to FIGS. 7, 10 and 13, evidencing an operating situation comparable to that of FIG. 3.

DESCRIPTION OF THE PREFERRED EMBODIMENTS

With reference to FIGS. from 5 to 7, 100 denotes a first embodiment of the novice, in its entirety: in FIGS. from 8 to 10, 200 denotes a second embodiment of the device.

The two above-mentioned embodiments relate to organs of a flexible transmission with cogs extending over the full breadth of the organs.

A third embodiment of the device, illustrated in FIGS. from 11 to 13 and denoted by 300, is provided for flexible transmission organs 30 in which the cogs are less broad than a whole breadth of the organ.

FIG. 14 relates to an identical operating situation which is realized in all included embodiments of the realization 100, 200, 300.

Figure 1:
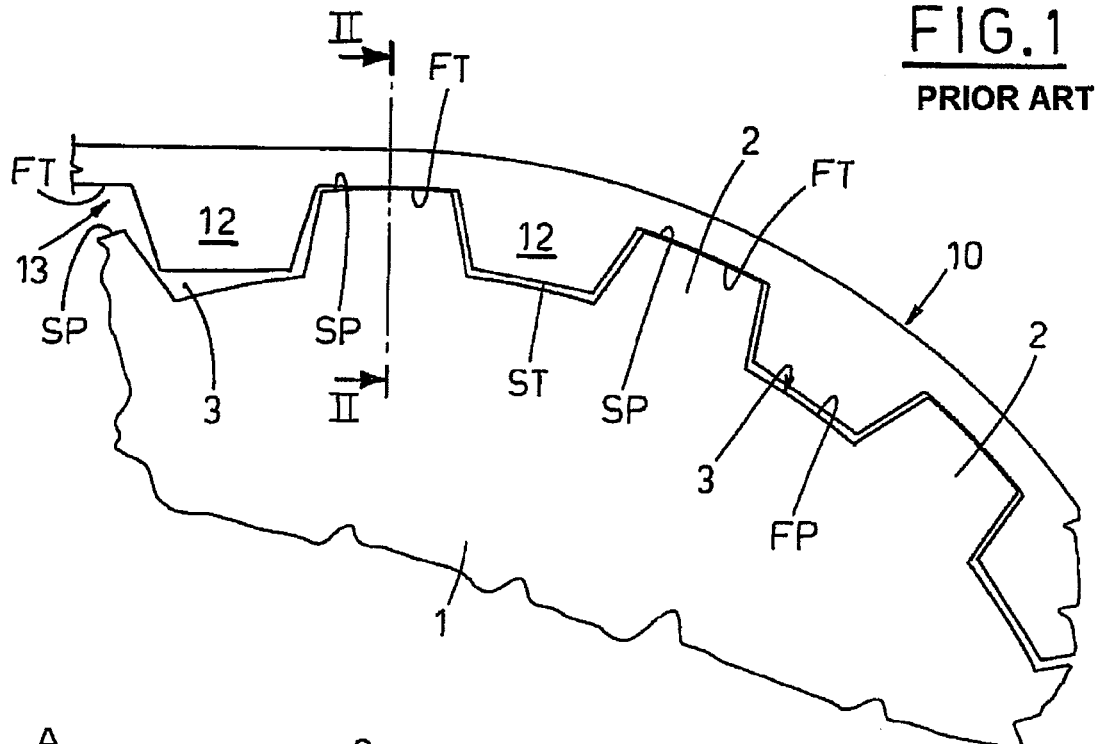
FIG. 1 is a lateral view of portions of a cogged belt 10 and a cogged drive pulley 1, in a known-type solution already described in the preamble to the present description.
Figure 3:
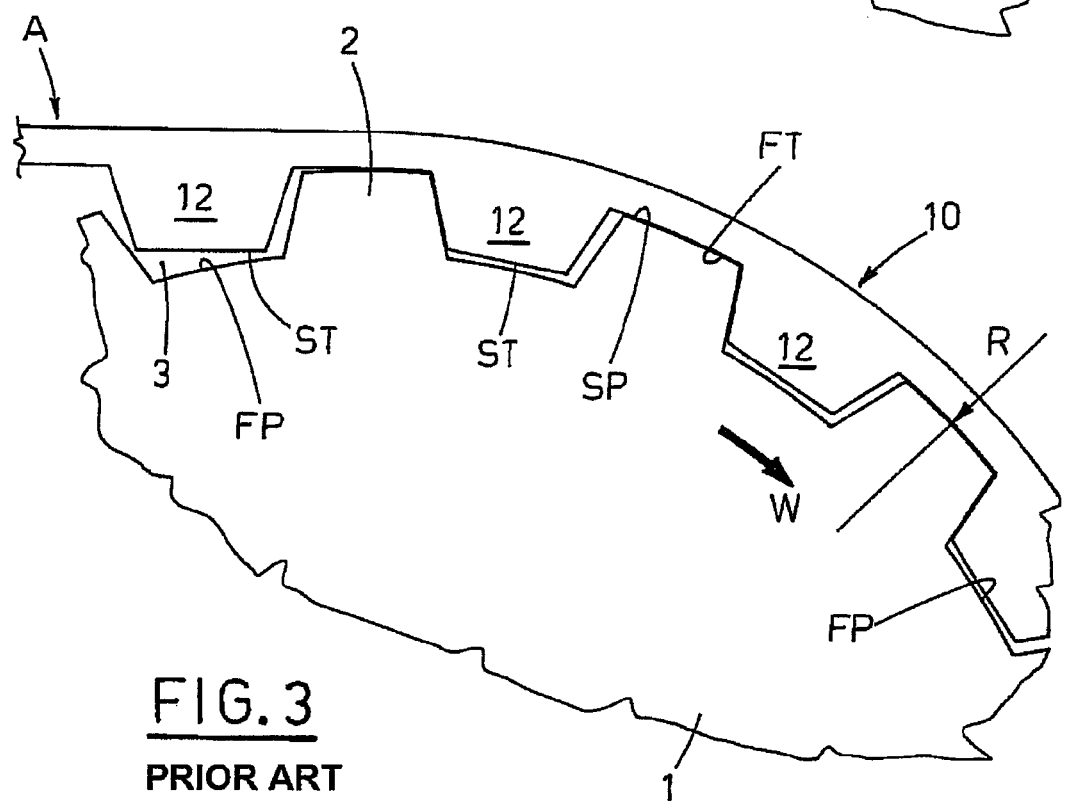
FIG. 3 is a similar view to that of FIG. 1, illustrating an operative situation already mentioned in the preamble to the present description.
Figure 4:
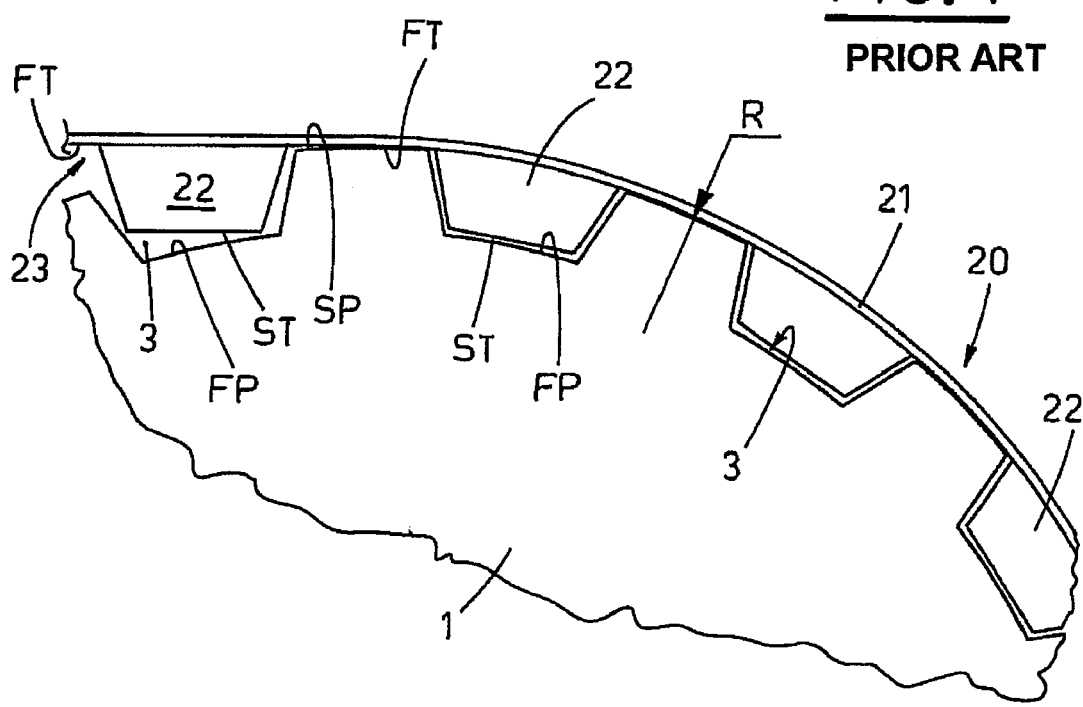
FIG. 4 is a similar view to that of FIG. 1, illustrating a different flexible transmission organ from the cogged belt, also mentioned in the preamble to the present description.
Figure 2:
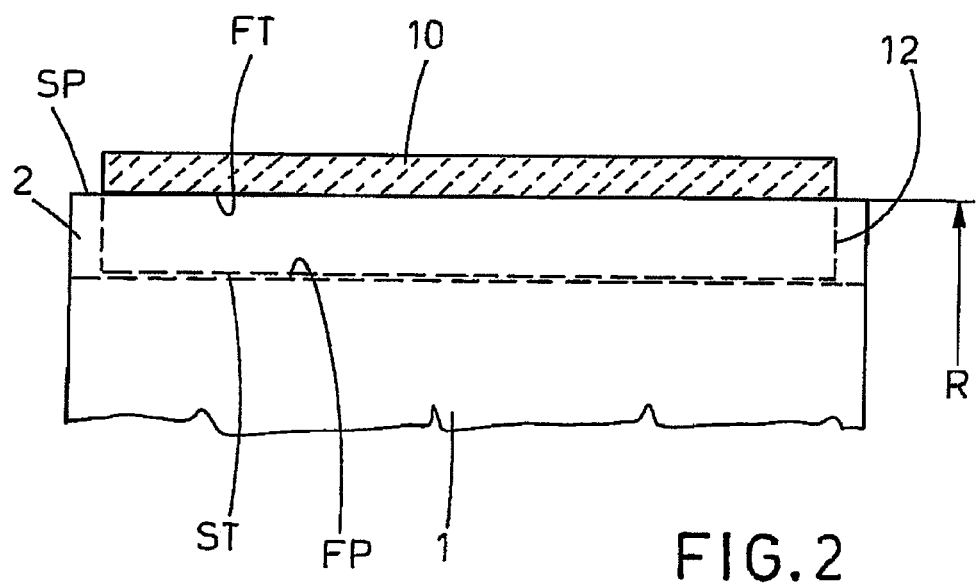
FIG. 2 is a transversal section of plane II-II of FIG. 1.

In FIGS. from 5 to 10, relating to the first and the second embodiments of the device, in order to facilitate the comparison with the prior art solution, described in the preamble and illustrated in FIGS. from 1 to 4, the reference numbers used are re-used, in particular:

10, 20 to denote the flexible transmission organ, constituted alternatively by a cogged belt (illustrated in FIGS. from 5 to 11) or by a sheet 21 provided with fashioned cogs 22 (not illustrated as identical to that of FIG. 4);

22 to denote the cogs of the flexible transmission organ 10, 20;

23 to denote the recesses of the flexible transmission organ, alternated with the cogs 12, 22;

ST to denote the top of the cogs 12, 22;

FT to denote the bottom of the recesses 13, 23.

For the purposes of the device 100, 200, the particular cogged flexible transmission organ 10, 20 can be of either type.

Even though FIGS. from 5 to 10 illustrate only the cogged belt 10, in the following description the general definition of cogged flexible organ will be used, with double number references used both for the belt 10 and the belt 20 with the sleet 21, also reported in the figures, to underline the fact that they can be used alternatively.

The device 100, 200, 300 is provided in place of the known-type drive pulley 1, and is associated to drive organs, not illustrated, which can activate it in a rotation direction W (clockwise in the figures) such that the stretched branch A of the cogged flexible organ 10, 20, 30 is the upper branch.

The arrangement illustrated in the figures, with a horizontal rotation axis, is purely by way of example, as obviously it would be possible to have an arrangement with a vertical or an inclined axis.

In the first embodiment (FIGS. 5, 6, 7) the device 100 comprises two support cogged pulleys 110, which are idle on the drive shaft (not illustrated) of the device 100, and a cogged drawing pulley 101, interposed between the support pulleys 110, keyed on the drive shaft of the device 100 and provided with cogs 102 for enmeshing with recesses 13, 23 of the flexible transmission organ 10, 20 in order to determine the advancing (see in particular FIG. 5).

The support pulleys 110 are provided with cogs 112, suitable sized in order to mesh with the recesses 13, 23 of the cogged flexible organ 10, such that there is play between both the relative flanks and the bottom FT of the recesses 12, 23 and the top 112S of the cogs 112 (FIG. 6).

The base rim of the recesses 113 of the pulleys 110, alternated with the cogs 112, defines, for each support pulley 110, a calibrated circumference C destined to contact the tops ST of the cogs 12, 22 of the flexible transmission organ 10, 20 in order to establish a predetermined winding radius R* of the transmission organ 10 (see FIG. 6).

The cogs 102 of the drawing pulley 101 are sized such that during enmeshing with the cogging of the flexible organ 10, 20 the respective tops 102S are displaced from the bottom FT of the recesses 13, 23 of the organ 10, and in turn the tops ST of the cogs 12, 22 of the flexible organ 10, 20 are displaced from the bottom 103F of the recesses 103 of the drawing pulley 101 (FIG. 7).

In the second embodiment (FIGS. 8, 9, 10) the device 200 also comprises two support pulleys 210, idle with respect to the drive shaft of the device 200, between which a drawing pulley 101 is interposed, keyed on the drive shaft (see in particular FIG. 8).

The support pulleys 210, in this case, are without cogs and the diameter thereof is such as to define the calibrated circumferences C on which the tops ST of the cogs 12, 22 of the flexible transmission organ 10, 20 rest, in order to establish the predetermined winding radius R* thereof (FIG. 9).

The drawing pulley 101 is identical to the pulley described for the first embodiment (FIG. 10).

In the third embodiment (FIGS. 11, 12, 13), as already mentioned, the flexible transmission organ 30 is of a type in which the cogs 32 have a shorter breadth than a total breadth of the organ 30.

The cogs 32 can be in a single body with the base belt 31 (as illustrated) or can be fashioned additions; the top of the cogs 32 is referred to by ST, as before.

The recesses 33, alternated with the cogs 32, exhibit a bottom which is, once more, denoted by FT.

Figure 11:
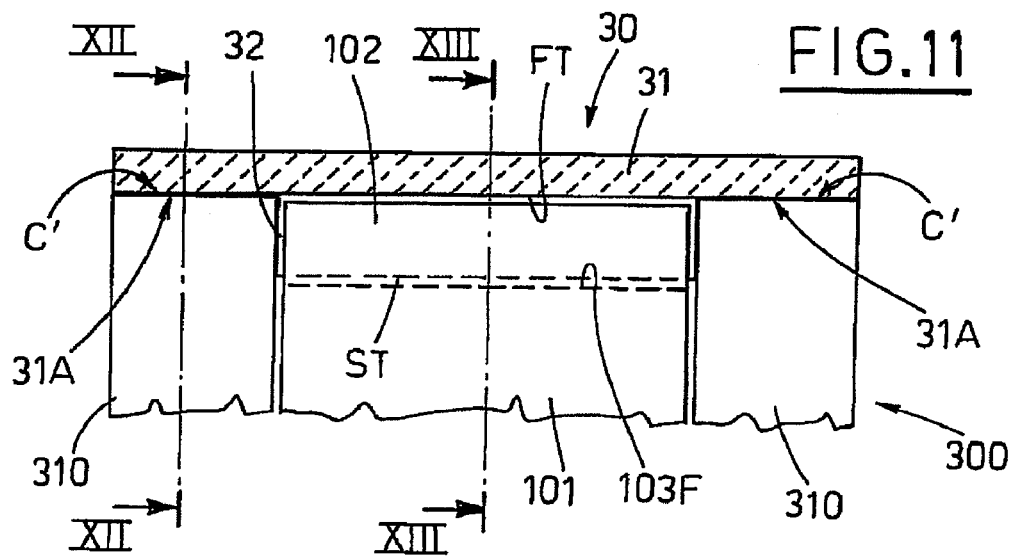
FIG. 11 is a schematic transversal section of FIGS. 5 and 8, with the device in a third embodiment with a special flexible transmission organ.

The transmission organ 30, in the illustrated example, has the cogging thereof both centered with respect to the breadth of the base belt 31 and the bottom FT of the recesses 33 aligned with the corresponding surface of the base belt 31 (FIG. 11).

Thus two smooth portions 31A are defined by the sides of the cogging.

For the above-cited flexible transmission organ 30, the device 300 also comprises two support pulleys 310, which are idle with respect to the drive shaft, between which a cogged drawing pulley 101 is arranged, keyed on the same drive shaft (see in particular FIG. 11).

Figure 12:
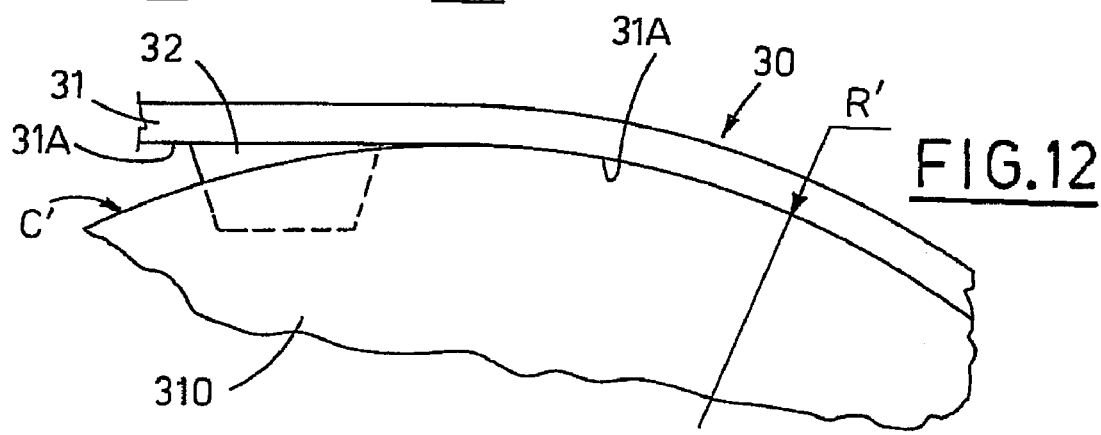
FIG. 12 is a lateral section of an element of the device, according to section line XII-XII of FIG. 11.

The support pulleys 310 are smooth (similarly to the pulleys 210) and their diameter is such as to define respective calibrated circumferences C' on which the cited smooth portions 31A rest, in order to establish a predetermined winding radius R' of the flexible transmission organ 30 (FIG. 12).

In this embodiment too, the drawing pulley 101 is identical to the one previously described (FIG. 13); of note, however, is the fact that for the flexible transmission organ 30 of the figures, the diameter of the pulley 101 is slightly smaller than the diameter of the support pulleys 310 (see FIG. 11).

In the above-described embodiment, the support pulleys 310 also have functions of lateral containment for the transmission organ 30, as they intercept the flanks of the cogs 32 (see FIG. 11 again).

For flexible transmission organs with full-breadth cogs, apart from the two illustrated and described embodiments, it is possible to have others, not illustrated, in which, for example, the following are present:

a single support pulley and a single drawing pulley, located side-by-side;

a central single support pulley and two drawing pulleys at sides thereof;

a plurality of support pulleys and drawing pulleys, alternating with one another.

The variants of the above-described device can also be obtained for the third embodiment, as long as the relative flexible transmission organs 30 exhibit a cogging having a transversal arrangement and development with respect to the base belt 31, as in the above options, and in order:

cogging displaced on a side of the base belt 31 and a single smooth portion 31A, for one only support pulley 310 and a single drawing pulley 101 located side-by-side;

double cogging on the sides of the base belt 31 with a single central smooth portion 31A, and two drawing pulleys 101 flanking it;

transversal lengths of cogging alternated with smooth portions 31A for a plurality of support pulleys and drawing pulleys, alternated with one another.

Figure 13:
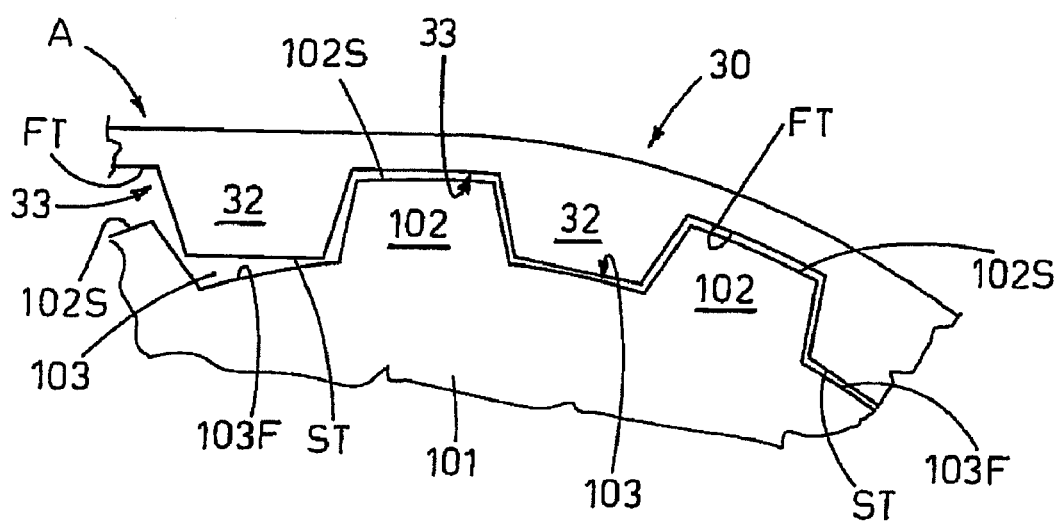
FIG. 13 is a lateral section of a further element of the device, according to section line XIII-XIII of FIG. 12.

In theoretical conditions, each cog 12, 22, 32 of the flexible transmission organ 10, 20, 30 is considered to be centered with respect to the corresponding recess 103 of the drawing pulley 101, such that the play is symmetrically distributed on the two sides (FIGS. 7, 10, 13).

The drawing of the flexible transmission organ 10, 20, 30 consequent to the activating of the device 100, 200, 300 is achieved only due to the contact between the flanks of the cogs 102 of the drawing pulley 101 and the cogs 12, 22, 32 of the flexible transmission organ 10, 20, 30 without dragging between the tops 102S and the bottoms FT of the recesses 13, 23, 33 (FIG. 14).

In the first two embodiments 100, 200, the tops ST of the portions of the cogs 12, 22 on the support pulleys 110, 210 contact the calibrated circumferences C of the rest pulleys 110, 210, without there being any dragging thanks to the fact that the rest pulleys 110, 210 are idle, as specified herein above.

Similarly, in the third embodiment of the device 300, the smooth portions 31A non-draggingly contact the calibrated circumferences C' of the support pulleys 310, which are also idle.

Therefore, in the device 100, 200, 300 the drawing pulley does not determine the winding radius of the flexible transmission organ while the rest pulleys, which have this function, are not subject to the drive torque, and therefore the above-mentioned drawback is totally eliminated, independently of the type and the size in terms of length of the flexible organ.

The proposed device is advantageously applicable both where the flexible transmission organ serves to activate at least a drawn pulley and where the transmission organ constitutes the belt of a conveyor.

Worthy of note is the fact that the technical solution of the device is very simple arid thus relatively inexpensive.

Further, with the device, thanks to the absence of dragging, wear on the flexible transmission organ is considerably reduced, in particular when the organ is a cogged belt.

The above however is intended as a non-limiting example, and any eventual modifications in the details are considered to fall within the ambit of protection as defined in the following claims.

What is claimed:

1. A device for activating a cogged flexible transmission organ, wherein cogs thereof have a narrower breadth than a total breadth of the flexible transmission organ, which comprises:

at least one support pulley borne idle on a drive shaft for abutting, at a calibrated circumference thereof, a smooth portion of a base belt of the flexible transmission organ, for defining a predetermined winding radius of the flexible transmission organ;

at least one cogged drawing pulley, flanked to the at least one support pulley, keyed on the drive shaft for rotation therewith, the at least one cogged drawing pulley having cogs for enmeshing with recesses of the cogged flexible transmission organ for advancing the cogged flexible transmission organ, the drawing pulley having cogs sized such that during enmeshing with and advancing the cogged flexible transmission organ, tops of the cogs of the cogged drawing pulley are displaced from bottoms of the recesses of the cogged flexible transmission organ and tops of the cogs of the flexible transmission organ are displaced from bottoms of recesses of the at least one drawing pulley.

2. The device of claim 1, the at least one support pulley comprising a first support pulley and a second support pulley, the cogged drawing pulley being interposed between the first support pulley and the second support pulley.

3. The device of claim 1, further comprising a plurality of support pulleys and a plurality of drawing pulleys, which are reciprocally alternated.

4. The device of claim 1, wherein the at least one support pulley has cogs, the cogs having flanks and sides sized to enmesh with the flanks and bottoms of the recesses of the cogged flexible transmission organ such during enmeshing of the cogs of the at least one support pulley and the recesses of the cogged flexible transmission organ, there is space provided between flanks of the at least one support pulley cogs and flanks of the flexible transmission organ recesses and between the bottoms of the at least one support pulley recesses and the top of the flexible transmission organ cogs, and wherein the calibrated circumference coincides with a bottom rim surface of the recesses of the at least one support pulley.

5. The device of claim 3, wherein the plurality of support pulleys have cogs, the cogs having flanks and sides sized to enmesh with the flanks and bottoms of the recesses of the cogged flexible transmission organ such during enmeshing of the cogs of the plurality of support pulleys and the recesses of the cogged flexible transmission organ, there is space provided between flanks of the support pulley cogs and flanks of the flexible transmission organ recesses and between the bottoms of the support pulley recesses and the top of the flexible transmission organ cogs, and wherein the calibrated circumference coincides with a bottom rim surface of the recesses of the support pulleys.

6. The device of claim 1, wherein the at least one support pulley does not exhibit cogs and a diameter thereof defines the calibrated circumferences.

* * * * *